United States Patent
Kitano et al.

(10) Patent No.: US 12,371,336 B2
(45) Date of Patent: Jul. 29, 2025

(54) LAYERED DOUBLE HYDROXIDE ELECTRIDE AND METHOD FOR PRODUCING SAME

(71) Applicant: JAPAN SCIENCE AND TECHNOLOGY AGENCY, Kawaguchi (JP)

(72) Inventors: Masaaki Kitano, Machida (JP); Hideo Hosono, Yamato (JP); Toshiharu Yokoyama, Yokohama (JP); Kiya Ogasawara, Hadano (JP); Yo Agawa, Yokohama (JP)

(73) Assignee: JAPAN SCIENCE AND TECHNOLOGY AGENCY, Kawaguchi (JP)

( * ) Notice: Subject to any disclaimer, the term of this patent is extended or adjusted under 35 U.S.C. 154(b) by 597 days.

(21) Appl. No.: 17/799,079

(22) PCT Filed: Feb. 15, 2021

(86) PCT No.: PCT/JP2021/005465
§ 371 (c)(1),
(2) Date: Aug. 11, 2022

(87) PCT Pub. No.: WO2021/166836
PCT Pub. Date: Aug. 26, 2021

(65) Prior Publication Data
US 2023/0083938 A1 Mar. 16, 2023

(30) Foreign Application Priority Data
Feb. 17, 2020 (JP) .................................. 2020-024751

(51) Int. Cl.
*C01D 1/34* (2006.01)
*C01D 1/42* (2006.01)

(52) U.S. Cl.
CPC ................ *C01D 1/34* (2013.01); *C01D 1/42* (2013.01); *C01P 2006/40* (2013.01)

(58) Field of Classification Search
None
See application file for complete search history.

(56) References Cited

U.S. PATENT DOCUMENTS

| 2006/0151311 A1 | 7/2006 | Hosono et al. |
| 2009/0224214 A1 | 9/2009 | Hosono et al. |

(Continued)

FOREIGN PATENT DOCUMENTS

| CN | 103230776 A | 8/2013 |
| CN | 109503405 A | 3/2019 |

(Continued)

OTHER PUBLICATIONS

English translation of WO 2012/102151 A1 Description. (Year: 2012).*

(Continued)

*Primary Examiner* — Anthony J Zimmer
*Assistant Examiner* — Zachary John Baum
(74) *Attorney, Agent, or Firm* — Panitch Schwarze Belisario & Nadel LLP (57) ABSTRACT

The invention is related to a layered double hydroxide electride which can be produced without high-temperature treatment, and a production method of which cost can be reduced. The layered double hydroxide electride contains electrons between layers and has an electron density of $2.0 \times 10^{18}$ cm$^{-3}$ or more. The method of producing the layered double hydroxide electride includes a step of mixing a starting layered double hydroxide with an electron exchanger for exchanging anions existing between layers of the starting layered double hydroxide for electrons to produce the layered double hydroxide electride.

9 Claims, 5 Drawing Sheets

(56) References Cited

U.S. PATENT DOCUMENTS

| | | | |
|---|---|---|---|
| 2013/0183224 | A1 | 7/2013 | Hosono et al. |
| 2014/0021404 | A1 | 1/2014 | Iyi et al. |
| 2015/0239747 | A1 | 8/2015 | Hosono et al. |

FOREIGN PATENT DOCUMENTS

| | | | |
|---|---|---|---|
| JP | 2003146651 A | 5/2003 | |
| JP | 2005-335965 A | 12/2005 | |
| JP | 2014024712 A | 2/2014 | |
| JP | 2014129202 A | 7/2014 | |
| JP | 2016157856 A | 9/2016 | |
| JP | 2017-114747 A | 6/2017 | |
| JP | 2018154505 A | 10/2018 | |
| KR | 10-2020-0060276 A | 5/2020 | |
| KR | 10-2020-0060277 A | 5/2020 | |
| WO | 2005000741 A1 | 1/2005 | |
| WO | 2007060890 A1 | 5/2007 | |
| WO | 2012077658 A1 | 6/2012 | |
| WO | 2012102151 A1 | 8/2012 | |
| WO | 2014/002756 A1 | 1/2014 | |
| WO | 2014034473 A1 | 3/2014 | |
| WO | 2018066483 A1 | 4/2018 | |

OTHER PUBLICATIONS

English translation of CN 103230776 A Description. (Year: 2013).*
Dye, J. Electrides: Early examples of quantum confinement. Acc. Chem. Res. 42, 10 (2009) 1564-1572. (Year: 2009).*
Hayashi, A. and Nakayama, H. Intercalation reaction of carbonate MgAl-layered double hydroxide using alcohol as solvent. Chem. Lett. 2011, 40, 276-278. (Year: 2011).*
Hibino, "Synthesis and Applications of Hydrotalcites", Clay Science, vol. 45, No. 2, pp. 102-109 (2006).
Dye, "Electrons as Anions", Science, vol. 301, pp. 607-608 (2003).
Kitano et al., "Ammonia synthesis using a stable electride as an electron donor and reversible hydrogen store", Nature Chem., vol. 4, pp. 934-940 (2012).
Lee et al., "Dicalcium nitride as a two-dimensional electride with an anionic electron layer", Nature, vol. 494, pp. 336-341 (2013).
Matsuishi et al., "High-Density Electron Anions in a Nanoporous Single Crystal", Science, vol. 301, pp. 626-629 (2003).
Zhang et al., "Two-Dimensional Transition-Metal Electride $Y_2C$", Chemistry of materials, vol. 26, pp. 6638-6643. (2014).
International Search Report (PCT/ISA/210) with an English translation mailed on Apr. 20, 2021, by the Japan Patent Office as the International Searching Authority for International Application No. PCT/JP2021/005465. (4 pages).
Office Action (Notification of the First Office Action) issued Sep. 12, 2023, by the National Intellectual Property Administration, P. R. China in corresponding Chinese Patent Application No. 202180012617.3 and an English translation of the Office Action. (15 pages).
Office Action (Notice of Reasons for Rejection) issued Feb. 14, 2023, by the Japan Patent Office in corresponding Japanese Patent Application No. 2022-501867 and a partial English translation of the Office Action. (5 pages).
Notice of Allowance issued on Jun. 27, 2024, by the China National Intellectual Property Administration in Chinese Application No. 202180012617.3 with partial English translation of the Notice.

\* cited by examiner

LAYERED DOUBLE HYDROXIDE ELECTRIDE AND METHOD FOR PRODUCING SAME

TECHNICAL FIELD

The present invention relates to a layered double hydroxide electride and a method of producing the same.

The application claims priority under Japanese Patent Application No. 2020-024751 filed on Feb. 17, 2020, the contents of which are hereby incorporated by reference.

BACKGROUND

An electride is a substance in which an electron behaves as an anion (for example, Non-Patent Document 1).

The electron contained in the electride does not belong to a specific orbital and is localized, so that the electron has a charge similar to that of a monovalent anion and exhibits quantum mechanical behavior due to its small mass. Therefore, attention is focused on its physical properties. In particular, interest in its application has increased because of its characteristics such as a high electron-donating ability derived from its low work function.

As an electride stable at normal temperature, for example, an electride obtained by using an inorganic compound, which is called as a "mayenite type compound", is disclosed (Patent Document 1, Non-Patent Document 2).

The "mayenite-type compound" is a calcium aluminosilicate containing Ca, Al, and O as constituents, and is a compound having the same crystal structure as that of a compound called mayenite. The mayenite-type compound has a structure in which a representative composition thereof is represented by $12CaO \cdot 7Al_2O_3$(C12A7) and 2 oxygen atoms are included as "free oxygen" in a space in a cage formed by the crystal skeleton thereof. The mayenite-type compound obtained by replacing free oxygens in the mayenite-type compound with electrons is an electride (hereinafter referred to as C12A7 electride) (Patent Document 1, Non-Patent Document 2). The C12A7 electride can be produced by performing heat-treatment to a single crystal, powder, or thin film of the C12A7 at a high temperature in titanium metal (Patent Document 2).

An S12A7 electride including an aluminum compound and a strontium compound ($12SrO \cdot 7Al_2O_3$) has been reported, and a method of producing the S12A7 electride compound has been reported. The method has a step of carrying out a reduction heat treatment at a temperature in a range of 1150° C. to 1530° C. under a reducing atmosphere (Patent Document 3). The S12A7 electride compound has a representative composition represented by $12SrO \cdot 7Al_2O_3$, and has voids (cages) formed by three-dimensionally connected skeletons. The cages contain anions and electrons, thereby exhibiting conductivity.

In addition to C12A7 and S12A7 electride compounds, another electride such as layered compounds $Ca_2N$ (Patent Document 4, Non-Patent Document 4) or $Y_2C$ (Non-Patent Document 5), which are stable at room temperature, are disclosed. It has been reported that electrons are confined within the cages in the crystal structure of these materials or between the layers of the crystals. For example, a high-temperature treatment of 1000° C. or higher is needed to obtain an electride from $Ca_2N$ or $Y_2C$.

The electride can be used as a catalyst by supporting a transition metal such as Ru, for example, and has been found to be a catalyst having particularly good ammonia synthesis ability (Non-Patent Document 3, Patent Documents 5 and 6). In addition, an electron-emitting device using an electride (Patent Document 2), a silicon-based thin-film semiconductor device using an amorphous electride C12A7: e− (Patent Document 7), a solar cell having a layer composed of a C12A7 electride, and a semiconductor device such as a thin-film transistor (Patent Document 8) have been reported.

However, a layered double hydroxide (hereinafter abbreviated as LDH) differs from clay minerals. In the layered double hydroxide, the layers have positive charges, and the layered double hydroxide contains anions between the layers and has anion exchange properties. The layered double hydroxides can intercalate anions between the layers of the structure.

The layered double hydroxides can be natural or synthetic substances. The most common anion found in a natural layered double hydroxide is a carbonate ion. However, as anions used in a synthetic LDH, a wide variety of interlayer anions can be theoretically incorporated, for example, a small inorganic anion such as a halide ion, a nitrate ion or a sulfate ion; an organic anion; and a complex two-molecule anion.

Figure 8:
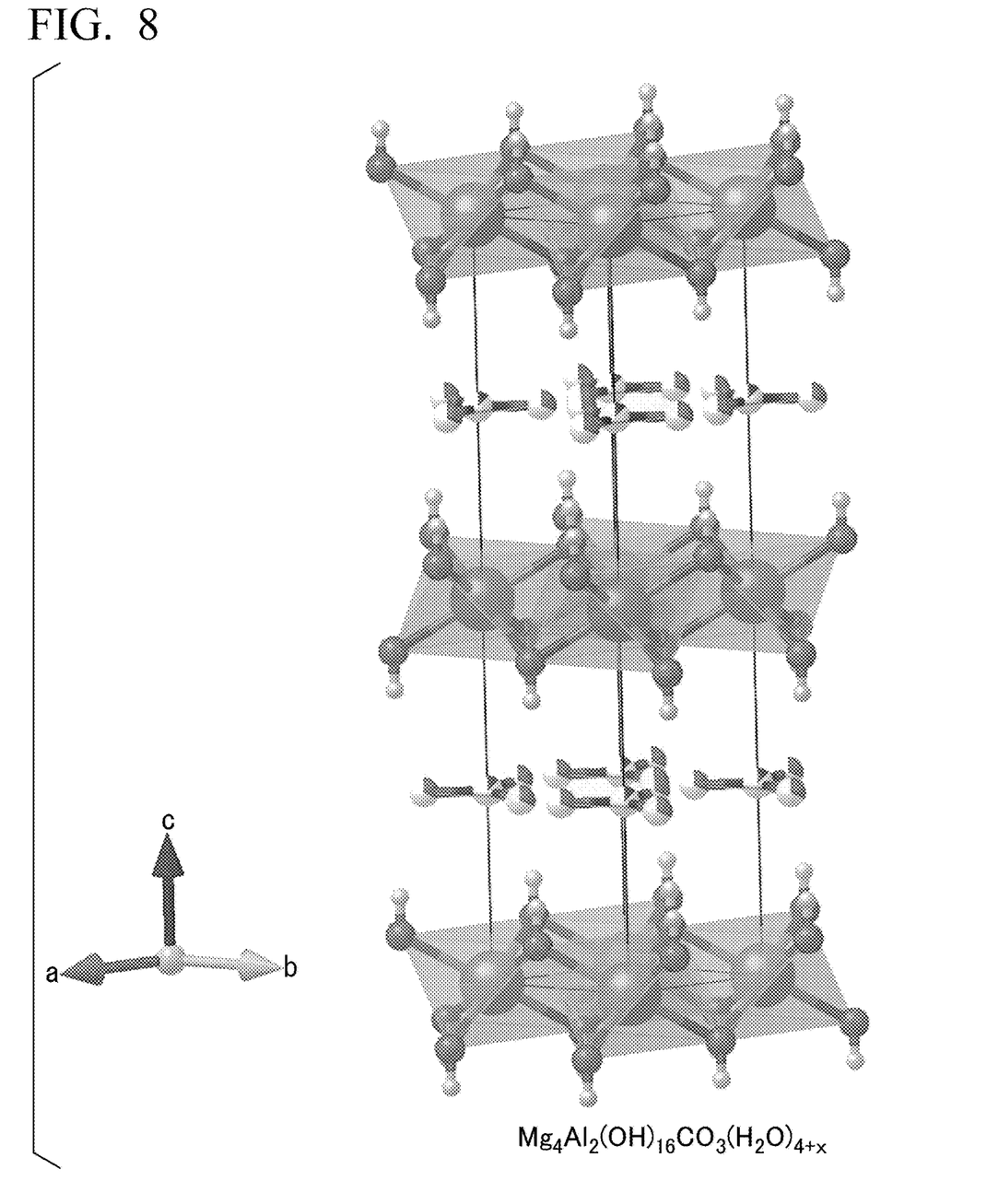
FIG. 8 is a schematic diagram of a layered structure of hydrotalcite as a type of layered double hydroxide.

A commercially available layered double hydroxide is a Mg—Al carbonate hydrotalcite represented by a general formula: $[Mg_6Al_2(OH)_{16}]CO_3 \cdot 4H_2O$. FIG. 8 shows a structure of a layered double hydroxide having a hydrotalcite layered structure represented by a formula: $Mg_4Al_2(OH)_{16}CO_3(H_2O)_{4+x}$.

PATENT DOCUMENTS

Patent Document 1: WO 2005/000741
Patent Document 2: WO 2007/060890
Patent Document 3: Japanese Unexamined Patent Application Publication No. 2018-154505
Patent Document 4: Japanese Unexamined Patent Application Publication No. 2014-24712
Patent Document 5: WO 2012/077658
Patent Document 6: WO 2014/034473
Patent Document 7: Japanese Unexamined Patent Application Publication No. 2016-157856
Patent Document 8: WO 2018/066483

Non-Patent Documents

Non-Patent Document 1: J. L. Dye, Science 301, 607-608 (2003).
Non-Patent Document 2: S. Matsuishi, Y. Toda, M. Miyakawa, K. Hayashi, T. Kamiya, M. Hirano, L Tanaka and H. Hosono, Science 301, 626 (2003).
Non-Patent Document 3: M. Kitano, Y. Inoue, Y. Yamazaki, F. Hayashi, S. Kanbara, S. Matsuishi, T. Yokoyama, S. Kim, M. Hara and Hideo Hosono, Nature Chem. 4, 934 (2012).
[Non-Patent Document 4] K. Lee, S. W. Kim, Y. Toda, S. Matsuishi and H. Hosono, Nature 494, 336 (2013).
Non-Patent Document 5: X. Zhang, Z. Xiao, H. Lei, Y. Toda, S. Matsuishi, T. Kamiya, S. Ueda and H. Hosono, Chem. Mat. 26, 6638 (2014).
Non-Patent Document 6: Toshiyuki Hibino, Synthesis and Utilization of Hydrotalcite, Clay Science Vol. 45 No. 2, 102-109 (2006).

SUMMARY

Problem to be Solved by Invention

The electride described in Patent Document 1 and the like is produced under a high temperature condition, so that there is a problem in that the burden in terms of equipment and cost is large.

However, the layered structure of the layered double hydroxide is unstable at high temperatures, and therefore, the layered double hydroxide cannot be treated at high temperatures in a reducing atmosphere. There is no disclosure regarding an electride made from a layered double hydroxide.

There is a need for an electride which can be industrially and inexpensively produced under a lower temperature condition.

Means for Solving Problem

The present invention has been developed by finding the layered double hydroxide electride of the present invention by the present inventors, said invention which can be produced without high temperature treatment and with a reduced production cost by intercalating electrons (e⁻) in exchange for anions between layers of layered double hydroxides.

Further, when the layered double hydroxide electride of the present invention is used as a catalyst, the surface area thereof is increased by avoiding the high-temperature treatment, and as a result, the number of reactive active sites can be increased.

That is, the embodiments of the present invention include the following:

[1] A layered double hydroxide electride which comprises electrons between layers and which has an electron density of $2.0 \times 10^{18}$ cm$^{-3}$ or more.

[2] The layered double hydroxide electride according to [1], wherein the layered double hydroxide electride is a layered double hydroxide electride represented by a general formula (1), $$[M^{p+}_{1-x}N^{q+}_{x}(OH)_2]^{a+}[A^{r-}_{(b-y)}e^{-}_{y}] \cdot mH_2O \qquad (1)$$

wherein, in the general formula (1),

M is a metal element capable of forming at least a monovalent metal cation;

N is different from M, and is a metallic element capable of forming at least a monovalent metal cation;

A is an atom or group of atoms capable of forming at least a monovalent anion;

p is 1 or 2;

q is 3 or 4;

r is 1 to 3;

$0 < x < 0.9$;

$a = p \times (1-x) + x \times q - 2$;

$b \geq a/r$;

$0 < y \leq b$; and

$0 \leq m \leq 10$.

[3] A method of producing a layered double hydroxide electride, comprising a step of mixing a starting layered double hydroxide and an electron exchanger which exchanges an anion existing between layers of the starting layered double hydroxide for an electron.

[4] The method of producing a layered double hydroxide electride according to [3], wherein the electron exchanger is a mixture of a crown ether compound and a THF-based organic solvent having an alkali metal.

[5] The method of producing a layered double hydroxide electride according to [3] or [4], wherein the layered double hydroxide electride is a layered double hydroxide electride represented by a general formula (1); and the starting layered double hydroxide is a layered double hydroxide represented by a general formula (2), $$[M^{p+}_{1-x}N^{q+}_{x}(OH)_2]^{a+}[A^{r-}_{b}] \cdot mH_2O \qquad (1)$$

wherein, in the general formula (1),

M is a metal element capable of forming at least a monovalent metal cation;

N is different from M, and is a metallic element capable of forming at least a monovalent metal cation;

A is an atom or group of atoms capable of forming at least a monovalent anion;

p is 1 or 2;

q is 3 or 4;

r is 1 to 3;

$0 < x < 0.9$;

$a = p \times (1-x) + x \times q - 2$;

$b \geq a/r$;

$0 < y \leq b$; and $0 \leq m \leq 10$, $$[M^{p+}_{1-x}N^{q+}_{x}(OH)_2]^{a+}[A^{r-}_{b}] \cdot mH_2O \qquad (2)$$

wherein, in the general formula (2), M, N, A, p, q, r, x, a, b, y, m have the same meaning as M, N, A, p, q, r, x, a, b, y, m in the general formula (1).

[6] The method of producing a layered double hydroxide electride according to [4] or [5], wherein the crown ether compound is at least one crown ether compound selected from the group consisting of 15-crown-5-ether, 12-crown-4-ether, and 18-crown-6-ether.

[7] The method of producing a layered double hydroxide electride according to [4] or [5], wherein the alkali metal is sodium.

[8] The method of producing a layered double hydroxide electride according to [4] or [5], wherein the crown ether compound is at least one crown ether compound selected from the group consisting of 15-crown-5-ether, 12-crown-4-ether, and 18-crown-6-ether; and the alkali metal is sodium.

[9] The method of producing a layered double hydroxide electride according to any one of [4] to [8], comprising:

a mixing step of mixing the crown ether with the THF-based solvent of the alkali metal to obtain a mixed liquid;

a producing step of adding the starting layered double hydroxide to the mixed liquid to produce a layered double hydroxide electride;

a cleaning step of cleaning the layered double hydroxide electride obtained in the producing step; and a drying step of drying the layered double hydroxide electride obtained in the cleaning step.

Effect of Invention

Since the layered double hydroxide electride of the present invention can be produced without high temperature treatment, the production cost can be reduced.

DESCRIPTION OF EMBODIMENTS (Layered Double Hydroxide Electride)

The layered double hydroxide electride of the present invention contains electrons between layers and has an electron density of $2.0 \times 10^{18}$ cm$^{-3}$ or more. Preferably, the electron density is in a range from $2.0 \times 10^{18}$ cm$^{-3}$ to $2.0 \times 10^{22}$ cm$^{-3}$. The layered double hydroxide electride according to claim 1 represented by general formula (1) is preferable.

$$[M^{p+}_{1-x}N^{q+}_{x}(OH)_2]^{a+}[A^{r-}_{(b-y)}e^{-}_{y}] \cdot mH_2O \quad (1)$$

In the general formula (1),

M is a metal element capable of forming at least a monovalent metal cation;

N is different from M, and is a metallic element capable of forming at least a monovalent metal cation;

A is an atom or group of atoms capable of forming at least a monovalent anion;

p is 1 or 2;

q is 3 or 4;

r is 1 to 3;

$0 < x < 0.9$;

$a = p \times (1-x) + x \times q - 2$;

$b \geq a/r$;

$0 < y \leq b$; and $0 \leq m \leq 10$.

Here, $M^{p+}$ denotes a metal cation, $N^{q+}$ denotes a metal cation, and $A^{r-}$ denotes an anion.

In the above formula (1), M is preferably at least one kind selected from the group consisting of Mg, Zn, Fe, Ca, Ni, Cu, Co, Mn, and Cd, which are divalent metals, and Li, which is a monovalent metal. M is more preferably at least one kind selected from the group consisting of Mg, Ca, and Zn.

In the above formula (1), N is preferably at least one selected from the group consisting of Al, Ga, Y, In, Fe, Co, Ni, Mn, Cr, Ti, V, and La, which are a trivalent metals, and Sn, Ti, and Zr, which are tetravalent metals. N is more preferably Al.

Preferably, x is $0.18 < x < 0.9$, more preferably, x is $0.18 < x < 0.5$, still more preferably, x is $0.18 < x < 0.4$, and most preferably, x is $0.2 < x < 0.33$.

The layered double hydroxide represented by the general formula (1) is a Zn/Al, Mg/Al, Zn/Mg/Al, Ni/Ti, Mg/Fe, Ca/Al, Ni/Al, or Cu/Al layered double hydroxide.

A in the layered double hydroxide may be an atom or group of atoms capable of forming any suitable organic or inorganic anion, such as a halide anion (for example, chloride ion), an inorganic oxyanion (for example, a carbonate ion, bicarbonate ion, hydrogen phosphate ion, dihydrogen phosphate ion, nitrite ion, borate ion, nitrate ion, phosphate ion, sulfate ion), or the like; an anionic surfactant (for example, sodium dodecyl sulfate, fatty acid salts, sodium stearate, or the like); an anionic chromophore; and/or an anionic UV absorber, such as 4-hydroxy-3-methoxybenzoic acid, 2-hydroxy-4-methoxybenzophenone-5-sulfonic acid (HMBA), 4-hydroxy-3-methoxycinnamic acid, p-aminobenzoic acid, and/or urocanic acid. A is preferably an atom or a group of atoms capable of forming an inorganic oxyanion or the like selected from a carbonate ion, bicarbonate ion, hydrogen phosphate ion, dihydrogen phosphate ion, nitrite ion, borate ion, nitrate ion, sulfate ion, or phosphate ion; or a mixture of two or more of them. More preferably, A is an atom or a group of atoms capable of forming an inorganic oxyanion or the like selected from a carbonate ion, bicarbonate ion, nitrate ion, or nitrite ion. Still more preferably, A is an atom or group of atoms capable of forming a halide anion.

In one embodiment of the invention, M is Ca, Mg, Zn, or Fe; N is Al; and A is a group of atoms capable of forming a carbonate ion, bicarbonate ion, nitrate ion, nitrite ion, and the like. Preferably, M is Ca, Mg, or Zn; N is Al; and A is an atomic group capable of forming a carbonate ion, bicarbonate ion, nitrate ion, nitrite ion, and the like. More preferably, M is Ca, Mg, or Zn; N is Al; and A is an atom capable of forming a chloride ion.

In one embodiment of the present invention, a layered double hydroxide electride represented by a general formula (3) is preferred.

$$[M^{2+}_{1-x}N^{3+}_{x}(OH)_2][A^{r-}_{((x/r)-y)}e^{-}_{y}] \cdot mH_2O \quad (3)$$

In the formula (3), M, N, A, r, x, y, m have the same meaning as M, N, A, r, x, y, m in the formula (1).

In one embodiment of the present invention, a layered double hydroxide electride represented by a general formula (4) is more preferred.

$$[Mg^{2+}_{1-x}Al^{3+}_{x}(OH)_2][Cl^{-}_{(x-y)}e^{-}_{y}] \cdot mH_2O \quad (4)$$

In the formula (4), x, y, and m have the same meaning as x, y, and m in the formula (1), and $y \leq x$.

In one embodiment of the present invention, a layered double hydroxide electride represented by a general formula (5) is still more preferred.

$$[Mg_{1-x}Al_{x}(OH)_2][e^{-}x] \cdot mH_2O \quad (5)$$

In general formula (5), x, y, and m have the same meaning as x, y, and m in the general formula (1).

Preferably, m is $0 \leq m \leq 7.5$, more preferably, $0 \leq m \leq 5$, still more preferably, $0 \leq m \leq 3$, and most preferably, $0 \leq m \leq 1$. The layered double hydroxide electride prepared by using a starting layered double hydroxide which is pre-treated by dehydration is preferable because it is expected to have an effect of suppressing deactivation of solvation electrons introduced by ion exchange. Specifically, for example, a layered double hydroxide electride having substantially m=0 can be used as an electride stable at ordinary temperature for a long period of time.

In one embodiment of the present invention, a BET specific surface area of the layered double hydroxide electride is preferably 10 m$^2$/g or more, more preferably 30 m$^2$/g or more, still more preferably 50 m$^2$/g or more, and most preferably 100 m$^2$/g or more.

The BET specific surface area can be evaluated by a nitrogen adsorption method. The details will be described in examples.

In one embodiment of the present invention, a tap density of the layered double hydroxide electride is not particularly limited as long as it has its effect in the intended use scene, and may be, for example, within a normal range.

In one embodiment of the invention, the electron density of the layered double hydroxide electride may range from, for example, $2.0 \times 10^{18}$ cm$^{-3}$ to $2.0 \times 10^{22}$ cm$^{-3}$. Preferably, the range is from $5.0 \times 10^{18}$ cm$^{-3}$ to $2.0 \times 10^{21}$ cm$^{-3}$. When the starting layered double hydroxide is $Mg_6Al_2OH_{16}Cl_2$, a positive charge ratio is Mg:Al=2:1, so that a specific upper limit of the electron density of the layered double hydroxide electride can be, for example, $1.1 \times 10^{22}$ cm$^{-3}$.

The electron density of the layered double hydroxide electride can be measured by iodine titration.

In the iodine titration method, the sample to be evaluated is placed in a 5 mol/L aqueous iodine solution, is dissolved with hydrochloric acid, and the amount of unreacted iodine contained in the solution is detected by titration with sodium thiosulfate. In this case, the iodine in the aqueous iodine solution is ionized by the following reaction due to the dissolution of the sample.

$$I_2 + e^- \rightarrow 2I^- \qquad (6)$$

When the solution of the iodine in water is titrated with sodium thiosulfate, unreacted iodine is converted to sodium iodide by a reaction represented by a formula (7).

$$2Na_2S_2O_3 + I_2 \rightarrow 2NaI + Na_2S_4O_6 \qquad (7)$$

The amount of iodine consumed in the reaction of the formula (6) is calculated by subtracting an amount of iodine detected by the titration in the formula (7) from an amount of iodine present in the first solution. Thus, the electron density of the layered double hydroxide electride to be evaluated can be measured.

For example, the electron ion density of the layered double hydroxide electride (238 h) obtained in Example 1 is measured by the above method, and the result is $6.53 \times 10^{20}$/cm$^3$.

The layered double hydroxide electride of one embodiment of the present invention is in the form of a black powder. This is due to the strong absorption of visible light.

The visible and ultraviolet absorption spectra of the layered double hydroxide electride of the present invention were measured by a diffuse reflection method using an integrating sphere. The light irradiated on the sample is partially absorbed and partially reflected. By detecting the reflected light, it is possible to know which wavelength of light the sample has absorbed. The measurement was carried out by an ultraviolet-visible spectrophotometer (Hitachi, U 4000), and in a wavelength range of 185 to 2500 nm.

<Method of Measuring Visible and Ultraviolet Absorption Spectra>

Figure 4:
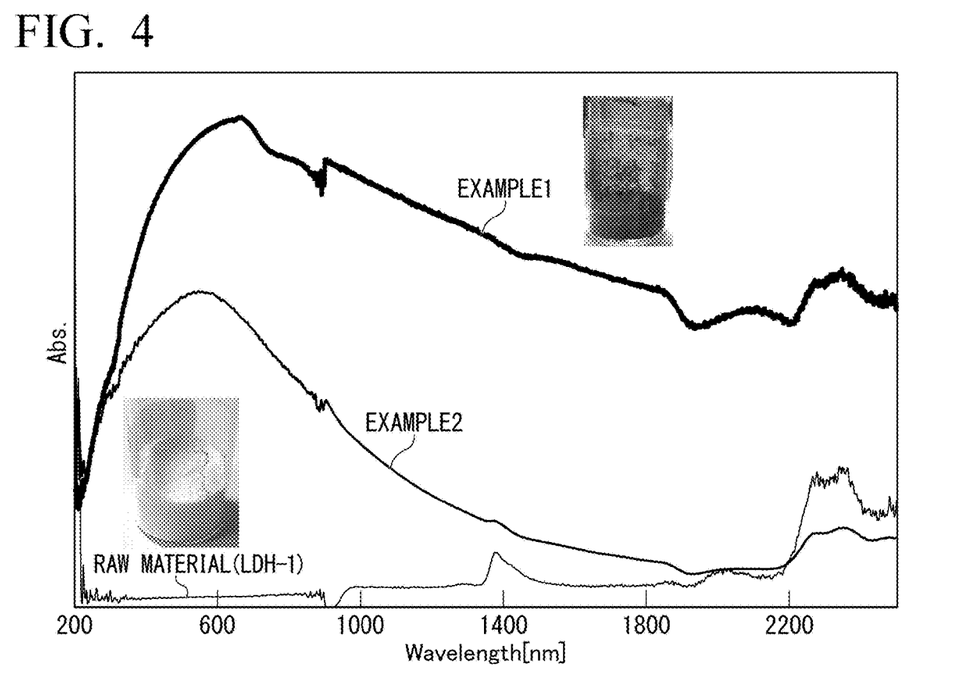
FIG. 4 is an absorption spectrum of a layered double hydroxide electride obtained in Examples 1 and 2.

FIG. 4 shows absorption spectra of the starting layered double hydroxide containing the chloride ion prior to ion exchange, the layered double hydroxide electride (238 h) of Example 1, and the layered double hydroxide electride (167 h) of Example 2. The starting layered double hydroxides were a white powder, and any absorption was unlikely observed in this wavelength region. However, strong absorptions were observed in the layered double hydroxide electrides of Examples 1 and 2 in a wavelength range of 600 to 2000 nm. This is very similar to the electron absorption of the C12A7 electride. That is, it is thought that electrons were inserted between the layers by ion exchange between the chloride ion (Cl$^-$) contained in the starting layered double hydroxide and the solvated electrons. It was also found from the experiments that it is not the case that a strong absorption appears in a wavelength range of 600 to 2000 nm due to the formation of an oxygen defect (F center) by the removal of oxygen ions from the framework of the layered double hydroxide.

The layered double hydroxide electride of the present invention can be analyzed by Fourier transform infrared spectroscopy (FT-IR).

Figure 5:
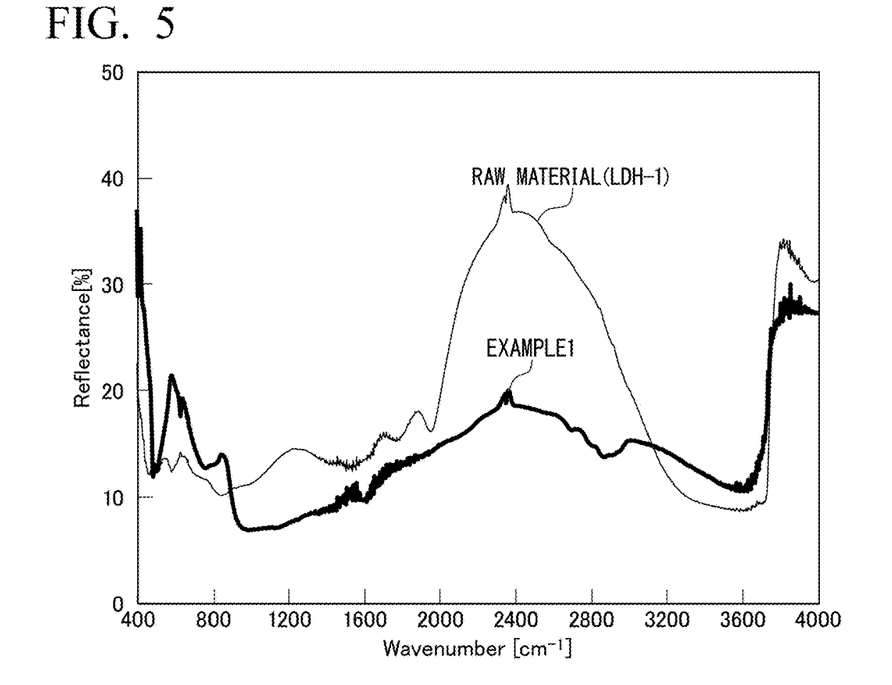
FIG. 5 is an absorption spectrum of a layered double hydroxide FT-IR obtained in Example 1.

For example, FIG. 5 shows FT-IR absorption spectra of the layered double hydroxide electride (238 h) of Example 1 and the starting layered double hydroxide. Absorption by OH groups at 3600 cm$^{-1}$ was observed in both cases, and it was found that OH groups remained in the layered double hydroxides even after becoming electrides.

Detailed measurement methods will be described in the examples.

Figure 6:
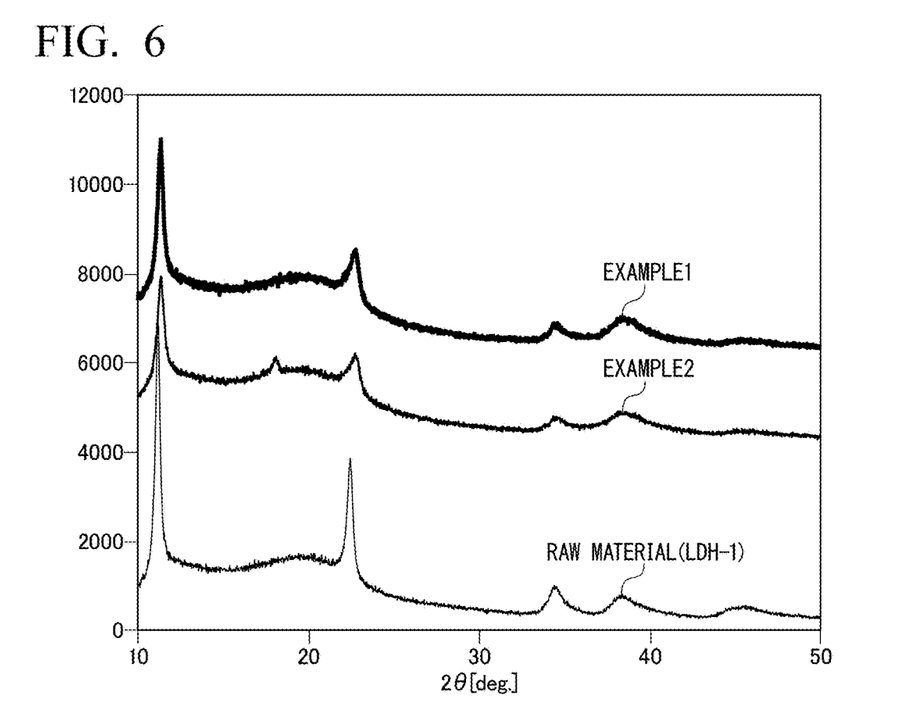
FIG. 6 is an XRD pattern of a layered double hydroxide obtained in Examples 1 and 2.

A structural change of the layered double hydroxide electride of the present invention from the starting layered double hydroxide can be observed by a powder XRD pattern. For example, XRD patterns (FIG. 6) of the layered double hydroxide electride obtained in Example 1 (238 h) and Example 2 (167 h) were compared with an XRD pattern of the starting layered double hydroxide. The basic crystal structures were maintained even when the starting layered double hydroxide was changed to an electride. However, since it was observed that the diffraction peak position was shifted to a slightly higher angle side, it can be inferred that an interlayer distance decreased because electrons with a smaller ionic radius than chloride ions entered the interlayer.

A magnitude of an equilibrium constant of the ion exchange increases with a decrease in the ionic radius of an anion such as a chloride ion or the like, for example, OH$^-$>F$^-$>Cl$^-$>Br$^-$>NO$_3^-$>I$^-$.

Detailed measurement methods will be described in the examples.

The results of electron spin resonance (ESR) analysis of the layered double hydroxide electride of the present invention are described below.

Figure 7:
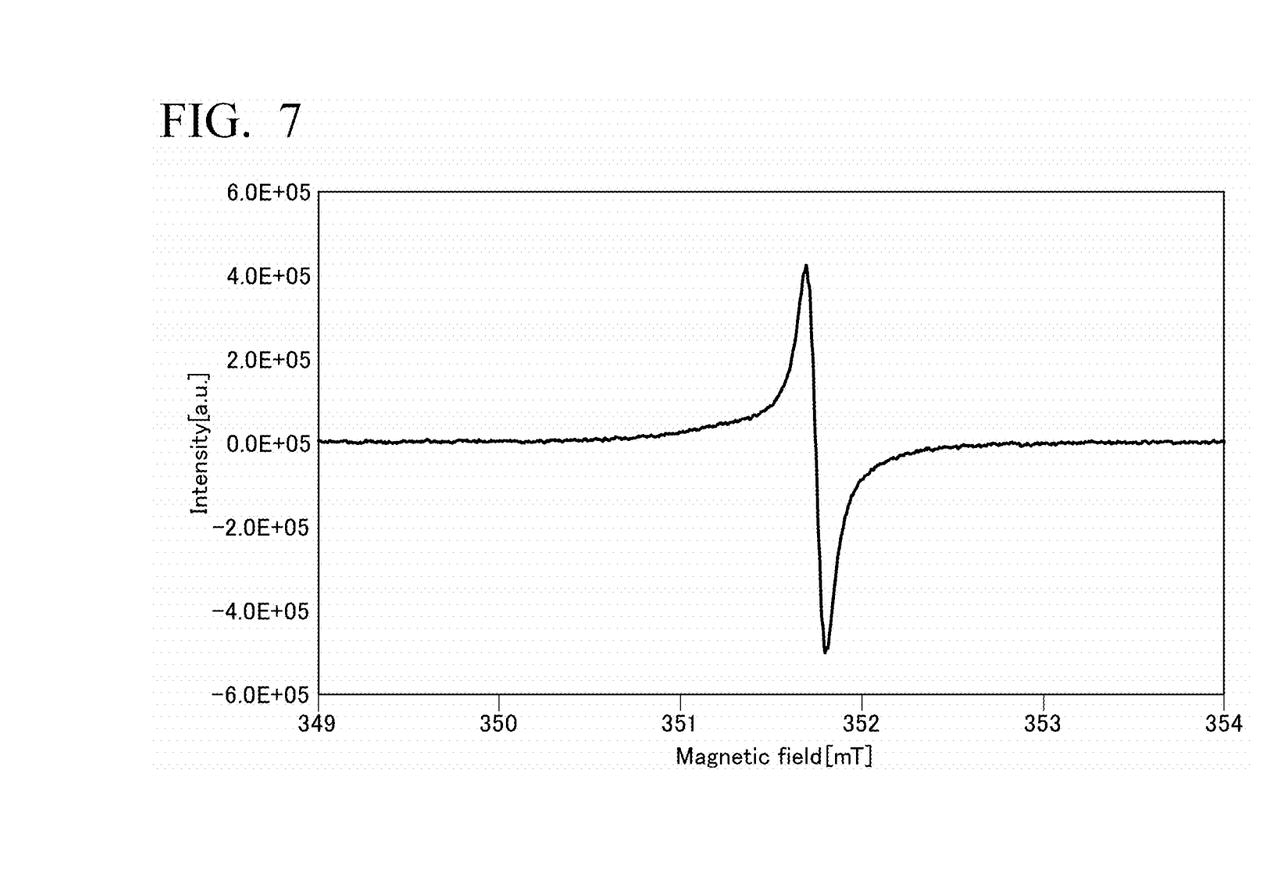
FIG. 7 is an ESR spectrum of the layered double hydroxide obtained in Examples 1 and 2.

For example, FIG. 7 shows the ESR spectrum of the layered double hydroxide electride (238 h) of Example 1. The ESR signal was not observed in normal layered double hydroxides because they had no unpaired electron, whereas the signal derived from the unpaired electron was observed in the layered double hydroxide electride (238 h). This spectrum is similar to that found in the C12A7 electride. From this fact, it is considered that the chloride ion in the layered double hydroxide and an electron could be exchanged by this method.

Figure 1:
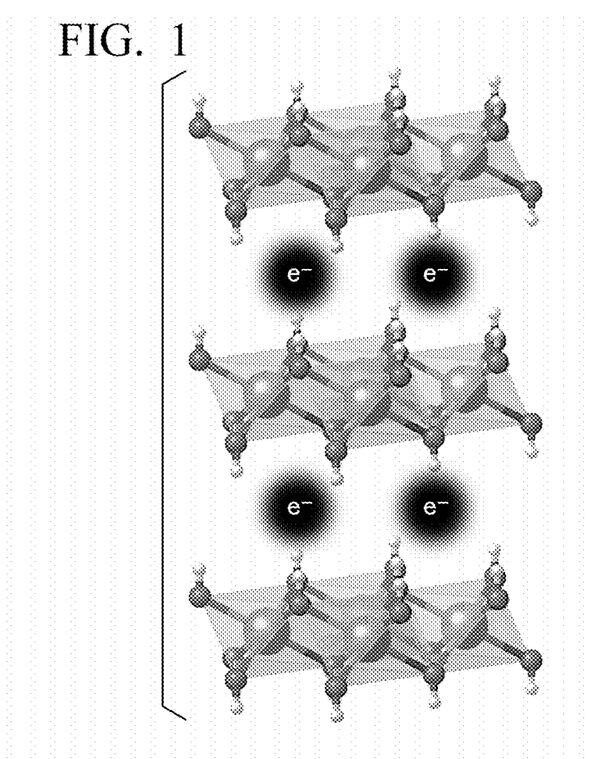
FIG. 1 is a schematic diagram of a layered structure of a layered double hydroxide electride of an embodiment of the invention.

A schematic diagram of a layered double hydroxide electride structure of an embodiment of the present invention is shown in FIG. 1. From the XRD and FT-IR results, it is considered that the basic framework consisting of Mg—O—Al in the layered double hydroxide has shown little change and the fact of having a large number of OH groups also does not change. On the other hand, the distance between the layers was slightly shortened by ion exchange between the anions of the starting layered double hydroxide and the solvation electrons, and ESR and iodometry indicated that electrons existed between the layers. These results suggest that the resulting product was an electride.

[Method of Producing Layered Double Hydroxide Electride]

The method of producing the layered double hydroxide electride includes a step of mixing a starting layered double hydroxide and an electron exchanger for exchanging anions existing between layers of the starting layered double hydroxide for electrons to produce the layered double hydroxide electride.

The electron exchanger is preferably a mixed liquid of a crown ether compound and a THF-based organic solvent having an alkali metal. That is, the method of producing the layered double hydroxide electride of the present invention preferably includes a step of mixing the crown ether compound, the THF-based organic solvent having the alkali metal, and the starting layered double hydroxide to produce the layered double hydroxide electride.

The layered double hydroxide electride is preferably represented by a general formula (1).

$$[M^{p+}_{1-x}N^{q+}_{x}(OH)_2]^{a+}[A^{r-}_{(b-y)}e^{-}_y]\cdot mH_2O \qquad (1)$$

In the general formula (1),
M is a metal element capable of forming at least a monovalent metal cation;
N is different from M, and is a metallic element capable of forming at least a monovalent metal cation;
A is an atom or group of atoms capable of forming at least a monovalent anion;
p is 1 or 2;
q is 3 or 4;
r is 1 to 3;
$0<x<0.33$;
$a=p\times(1-x)+x\times q-2$;
$b\geq a/r$;
$0\leq y\leq b$; and
$0\leq m\leq 10$.

The preferred form of the layered double hydroxide electride in the method of producing the layered double hydroxide electride of the present invention is the same as the preferred form of the "layered double hydroxide electride" described above.

Figure 2:
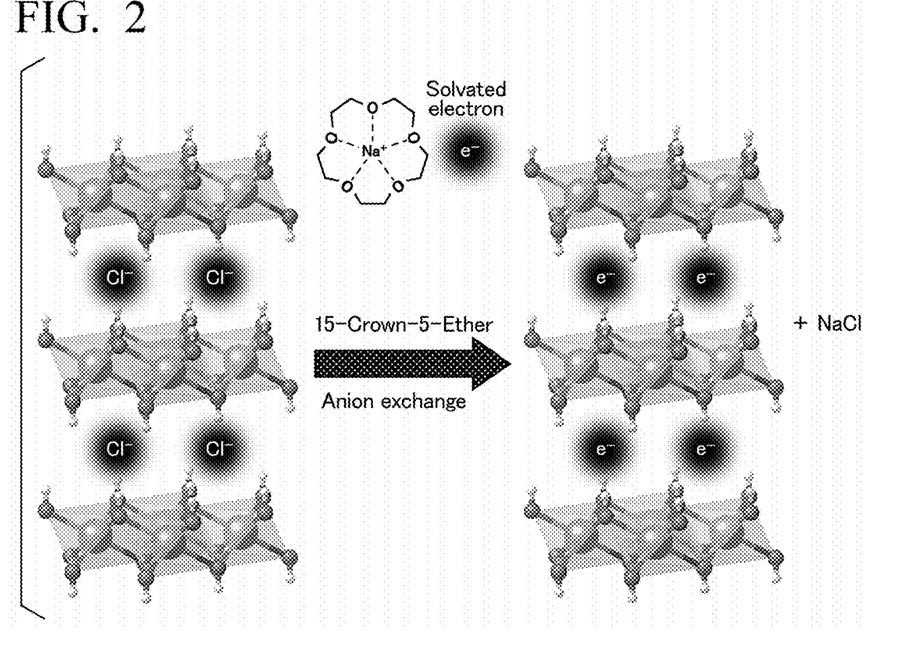
FIG. 2 is a schematic diagram illustrating a method of producing a layered double hydroxide electride according to an embodiment of the present invention.

FIG. 2 is a schematic diagram illustrating a method of producing a layered double hydroxide electride according to an embodiment of the present invention. FIG. 2 shows a method of synthesizing a layered double hydroxide electride from a starting layered double hydroxide containing chloride ions (Cl⁻) between the layers by using a crown ether compound and sodium.

(Starting Layered Double Hydroxide)

The starting layered double hydroxide in the method of producing the layered double hydroxide electride of the present invention is preferably a starting layered double hydroxide represented by a general formula (2).

$$[M^{p+}_{1-x}N^{q+}_{x}(OH)_2]^{a+}[A^{r-}_b]\cdot mH_2O \qquad (2)$$

In the general formula (2), M, N, A, p, q, r, x, a, b, m have the same meaning as M, N, A, p, q, r, x, a, b, m in the general formula (1).

Here, $M^{p+}$ denotes a metal cation, $N^{q+}$ denotes a metal cation, and $A^{r-}$ denotes an anion. In the general formula (2), M is preferably at least one kind selected from the group consisting of Mg, Zn, Fe, Ca, Ni, Cu, Co, Mn, and Cd, which are divalent metals, and Li, which is a monovalent metal. M is preferably at least one kind selected from the group consisting of Mg, Ca, and Zn.

In the above formula (2), N is preferably at least one kind selected from the group consisting of Al, Ga, Y, In, Fe, Co, Ni, Mn, Cr, Ti, V, and La, which are trivalent metals, and Sn, Ti, and Zr, which are tetravalent metals. It is preferable that N is Al.

Preferably, x is $0.18<x<0.9$, more preferably, x is $0.18<x<0.5$, and still more preferably, x is $0.18<x<0.4$.

As a specific starting layered double hydroxide represented by formula (2), a (starting) layered double hydroxide such as a Zn/Al, Mg/Al, Zn/Mg/Al, Ni/Ti, Mg/Fe, Ca/Al, Ni/Al, or Cu/Al layered double hydroxide can be used.

A in the starting layered double hydroxide may be any an atom or group capable of forming a suitable organic or inorganic anion, such as a halide anion (for example, chloride ion), an inorganic oxyanion (for example, a carbonate ion, bicarbonate ion, hydrogen phosphate ion, dihydrogen phosphate ion, nitrite ion, borate ion, nitrate ion, phosphate ion, sulfate ion), or the like; an anionic surfactant (for example, sodium dodecyl sulfate, fatty acid salts, sodium stearate, or the like); an anionic chromophore; and/or an anionic UV absorber, such as 4-hydroxy-3-methoxybenzoic acid, 2-hydroxy-4-methoxybenzophenone-5-sulfonic acid (HMBA), 4-hydroxy-3-methoxycinnamic acid, p-aminobenzoic acid, and/or urocanic acid. A is preferably an atom or a group of atoms capable of forming an inorganic oxyanion or the like selected from a carbonate ion, bicarbonate ion, hydrogen phosphate ion, dihydrogen phosphate ion, nitrite ion, borate ion, nitrate ion, sulfate ion, or phosphate ion; or a mixture of two or more of them. More preferably, A is an atom or a group of atoms capable of forming an inorganic oxyanion or the like selected from a carbonate ion, bicarbonate ion, nitrate ion, or nitrite ion. Still more preferably, A is an atom or group of atoms capable of forming a halide anion.

In one embodiment of the invention, M is Ca, Mg, Zn, or Fe; N is Al; and A is a group of atoms capable of forming a carbonate ion, bicarbonate ion, nitrate ion, nitrite ion, and the like. Preferably, M is Ca, Mg, or Zn; N is Al; and A is an atomic group capable of forming a carbonate ion, bicarbonate ion, nitrate ion, nitrite ion, and the like. More preferably, M is Ca, Mg, or Zn; N is Al; and A is an atom capable of forming a carbonate ion.

In one embodiment of the present invention, a starting layered double hydroxide represented by a general formula (8) is preferred.

$$[M^{2+}_{1-x}N^{3+}_{x}(OH)_2][A^{r-}_{(x/r)}]\cdot mH_2O \qquad (8)$$

In formula (8), M, N, A, r, x, m have the same meaning as M, N, A, r, x, m in formula (1).

In one embodiment of the present invention, a starting layered double hydroxide represented by a general formula (9) is more preferred.

$$[Mg^{2+}_{1-x}Al^{3+}_{x}(OH)_2][Cl^{-}_{(x-y)}]\cdot mH_2O \qquad (9)$$

In the formula (9), x, y, and m have the same meaning as x, y, and m in the formula (1), and $y\leq x$.

Preferably, m is $0\leq m\leq 7.5$, more preferably, $0\leq m\leq 5$, still more preferably, $0\leq m\leq 3$, and most preferably, $0\leq m\leq 1$. The starting layered double hydroxide may be pre-treated by dehydration treatment. As the dehydration treatment, for example, a method of evacuating for about 6 hours under heating at about 200° C. can be used. Thus, a starting layered double hydroxide having substantially m=0 can be obtained, and it is expected to have an effect of suppressing deactivation of solvation electrons introduced by ion exchange.

In one embodiment of the present invention, the BET specific surface area of the starting layered double hydroxide is preferably 10 m²/g or more, more preferably 30 m²/g or more, still more preferably 50 m²/g or more, and most preferably 100 m²/g or more.

The BET specific surface area can be evaluated by a nitrogen adsorption method. The details will be described in the embodiment.

In one embodiment of the present invention, the tap density of the starting layered double hydroxide is not particularly limited as long as the layered double hydroxide electride produced has its effect in the intended use, and may, for example, be in a normal range.

(Electronic Exchanger)

The electron exchanger in the manufacturing method of the present invention is not limited as long as the anion existing between the layers can be exchanged for electrons from the starting layered double hydroxide. It is preferable that the anions existing between the layers at 100° C. or less are exchanged for electrons, and it is more preferable that the anions existing between the layers at 50° C. or less are exchanged for electrons. The electron exchanger can be appropriately selected depending on the type of anion present in the interlayer. For example, a mixture of a crown ether compound and a THF-based organic solvent having an alkali metal such as sodium; a mixture of liquid ammonia and alkali metal such as sodium; alkali metal naphthalenide such as sodium naphthalenide; and the like can be used. In particular, when the interlayer anion of the starting layered double hydroxide is a chloride ion, the electron exchanger is preferably a mixed liquid of a crown ether compound and a THF-based organic solvent having an alkali metal such as sodium.

(Crown Ether Compound)

The crown ether compound in one embodiment of the present invention is not particularly limited as long as the compound is a cyclic polyether and has a function of forming a multidentate ligand in the entire ring via an electron-donating oxygen atom and incorporating alkali metal ions into the pores of the ring.

Examples of these compounds include 12-crown-4, 15-crown-5, 18-crown-6, benzo18-crown-6, benzo15-crown-5, dibenzo18-crown-6, dibenzo18-crown-3, dibenzo24-crown-8, dibenzo30-crown-10, dicyclohexano18-crown-6, dicyclohexano24-crown-8, and the like. Among them, 12-crown-4, 15-crown-5, 18-crown-6, benzo18-crown-6, dibenzo18-crown-6, dicyclohexano18-crown-6, and the like are preferably used; 12-crown-4, 15-crown-5, 18-crown-6, and the like are more preferably used; and 18-crown-6 is still more preferably used.

The alkali metal ion to be incorporated is preferably a potassium ion, sodium ion, lithium ion, or the like. More preferably, a potassium ion, sodium ion, or the like is used. Two or more kinds of the crown ether compound may be used in combination as needed. When the interlayer anion of the starting layered double hydroxide is a chloride ion, it is preferable to contain at least 1 kind of crown ether compound selected from the group consisting of 15-crown-5-ether, 12-crown-4-ether, and 18-crown-6-ether.

(THF-Based Organic Solvent)

The THF-based organic solvent is preferably at least one kind selected from the group consisting of THF, MeTHF, and diMeTHF.

(Reaction Condition)

The reaction temperature in the manufacturing method of the present invention is preferably −50 to 100° C., more preferably 0 to 50° C., and still more preferably 10 to 30° C. The reaction pressure is not particularly limited, and may be, for example, atmospheric pressure.

The reaction time is usually 20 to 500 hours, preferably 50 to 400 hours, and more preferably 170 to 300 hours.

Although the atmosphere of the reaction system is not particularly limited, from the viewpoint of safety, oxygen is avoided; and it is preferable that the reaction system be in an inert gas atmosphere such as nitrogen or argon from the viewpoint of preventing the incorporation of carbon dioxide or the like which affects the particle size and aspect ratio.

The reaction may be carried out under stirring, may be carried out under standing, may be carried out under external circulation, etc.

After the termination of the reaction, the reaction product is subjected to solid-liquid separation and is washed with a predetermined solvent to obtain the desired layered double hydroxide electride.

(Amount of Feeding)

In one embodiment of the manufacturing method of the present invention, for example, when a mixture of a crown ether compound and an alkali metal THF-based solvent is used as an electron exchanger and a monovalent anion chloride ion (Cl—) is used, it is preferable that the amount of the crown ether is 1 mol or more and the amount of alkali metal is 1 mol or more with respect to 1 mol of chloride ion of the layered double hydroxide. More preferably, the crown ether is 5 mol or more and the alkali metal is 5 mol or more. From the viewpoint of obtaining an electride having a higher electron density, it is still more preferable that the crown ether is 10 mol or more and the alkali metal is 10 mol or more.

The amount of the THF-based solvent used is not particularly limited, but is preferably 10 ml, and more preferably 20 ml, with respect to 0.23 g of the alkali metal.

Figure 3:
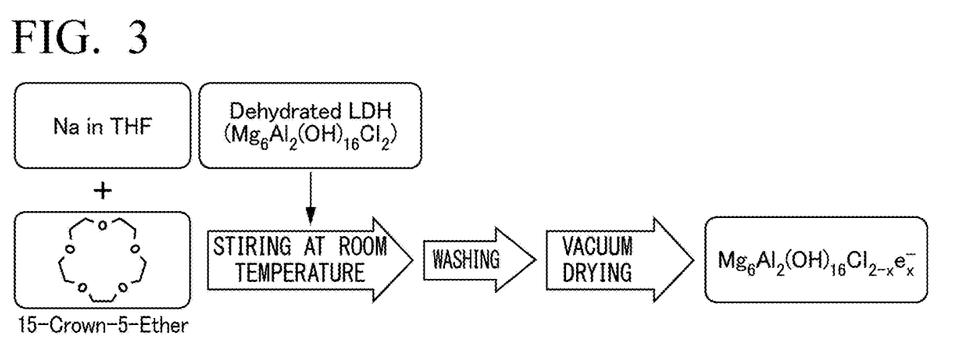
FIG. 3 is a schematic diagram illustrating a step of producing a layered double hydroxide electride of an embodiment of the present invention.

The method of producing the layered double hydroxide electride of the present invention preferably further includes a cleaning step and a drying step. Specifically, an embodiment of the method of producing the layered double hydroxide electride of the present invention preferably includes a mixing step of mixing the crown ether with an alkali metal THF-based solvent to obtain a mixed liquid, a producing step of adding a starting layered double hydroxide to the mixed liquid to produce the layered double hydroxide electride, a cleaning step of cleaning the layered double hydroxide electride obtained in the producing step, and a drying step of drying the layered double hydroxide electride obtained in the cleaning step. FIG. 3 is a schematic diagram illustrating a step of producing a layered double hydroxide electride of an embodiment of the present invention.

As a cleaning step in one embodiment of the present invention, after the completion of ion exchange, the solution is charged into a centrifuge tube made of Teflon (registered trademark) and is centrifuged using a centrifuge at 20,000 G for a holding time of 5 minutes. The supernatant liquid is removed, THF is charged, the centrifuge tube is stirred, and the centrifuge tube is centrifuged under the same conditions. This is repeated three times to remove the impurity crown ether. These operations are performed in a glove box with an Ar atmosphere.

As a drying step according to one embodiment of the present invention, a method such as vacuum drying, heat drying, delivery drying, and the like can be used.

For example, the layered double hydroxide electride obtained in the cleaning step is subjected to a vacuum evacuation treatment while being heated at a temperature in a range from a room temperature to 80° C. (as an example, 50° C.) for 12 to 24 hours to obtain a powdery layered double hydroxide electride.

Applications of the layered double hydroxide electride of the present invention include the following examples. However, the present invention is not limited to the following examples.

<Application as High-Performance Catalyst>

The layered double hydroxide electride can be used as a catalyst for a chemical reaction, such as a chemical reaction involving hydrogen ($H_2$) activation, a chemical reaction including nitrogen activation ($N_2$), an amination reaction, a reaction for producing carbon monoxide (useful as a chemical raw material) from carbon dioxide, a reduction reaction for producing a secondary alcohol or a diketone compound from a ketone compound, a reductive coupling reaction for producing a diol or a polydiol from a carbonyl compound, and the like.

Examples of the chemical reactions involving hydrogen ($H_2$) activation include a hydrogenation of a compound such as an olefin, aromatic compound, acetylene-based compound, aldehyde, carboxylic acid, ester, imine, nitrile, nitro compound, nitric acid, carboxylic acid chloride, ether, and/or acetal.

When the layered double hydroxide electride of the present invention is used as a catalyst for a chemical reaction, it is preferably used as a catalyst for a chemical reaction at 200° C. or lower, for example. Preferably, it is used as a base catalyst, a base catalyst component, or a reducing agent.

The layered double hydroxide electride of the present invention can be used as a hydrogen generation catalyst capable of generating hydrogen from, for example, water.

<Applications as Electronic Material>

Examples of the applications of the layered double hydroxide electride of the present invention as an electronic material include a cold electron emission source and an electron injection layer for an organic EL element, which include a conductive material having an electride; or a conductive barrier material of source-drain electrodes of an oxide-TFT.

<Applications as Battery Material>

Examples of applications of the layered double hydroxide electride of the present invention as an electronic material include a solar cell comprising a conductive material having an electride, and a solid polymer fuel cell or the like containing a conductive material having an electride as a platinum alternative catalyst.

EXAMPLES

The present invention will now be described in more detail with reference to examples.

(Method of Measuring Specific Surface Area)

Specific surface areas of the following examples and comparative examples were measured by adsorbing nitrogen gas at a liquid nitrogen temperature. The analytical conditions are shown as follows.

"Measurement Condition"

Equipment: BELSORP-mini II, manufactured by MicrotracBEL Corporation

Adsorbed gas: nitrogen (99.99995%)

Adsorption temperature: liquid nitrogen temperature (−196° C.)

(Method of Measuring Electron Concentration)

Electron concentration measurements of the following examples and comparative examples were performed by an iodine titration method. The conditions are shown as follows.

Approximately 10 mg of a layered double hydroxide was added to 3 mL of an iodine solution (0.05 mol/L), and then 0.1 mL of concentrated hydrochloric acid (35 to 37%) was added thereto. The mixture was stirred thoroughly. After that, titration was then performed by using 5 mmol/L aqueous sodium thiosulfate solution.

(UV-Visible Absorption Spectrum Analysis)

The UV-visible absorption spectra of the following examples and comparative examples were measured by a diffuse reflection method. The analytical conditions are shown as follows.

"Measurement Condition"

Equipment: U-4000, manufactured by Hitachi High-Tech Corporation

Measured wavelength: 185 to 2500 nm (Fourier Transform Infrared Spectroscopy (FT-IR) Analysis)

The infrared absorption spectra of the following examples and comparative examples were measured by a diffuse reflection method. The analytical conditions are shown as follows.

"Measurement Condition"

Equipment: IRTracer-100, manufactured by Shimadzu Corporation

Measured wave number: 400 to 4000 cm$^{-1}$ (Powder XRD Analysis)

The X-ray diffraction patterns of the following examples and comparative examples were measured using the following apparatus. The analytical conditions are shown as follows.

"Measurement Condition"

Equipment: D8 Advance, manufactured by Bruker Corporation

Measuring range: 10 to 50°

(Electron Spin Resonance ESR Analysis)

The ESR analyses of the following examples and comparative examples were measured using the following apparatus. The analytical conditions are shown as follows.

"Measurement Condition"

Equipment: EMX8/2.7, manufactured by Bruker Corporation

Measurement temperature: room temperature

Synthesis Example 1

As a starting material, $Mg_6Al_2(OH)_{16}Cl_2 \cdot nH_2O$ was synthesized by coprecipitating a solution containing $Mg^{2+}$, $Al^{3+}$, and $Cl^-$ under basic conditions. $AlCl_3 \cdot 6H_2O$ (made by Wako Pure Chemical Industries, Ltd., Reagent Special Class) and $MgCl_2 \cdot 6H_2O$ (made by Wako Pure Chemical Industries, Ltd., Reagent Special Class) were weighed in a molar ratio of 3:1, dissolved in ultrapure water with low resistivity of 18.2 MΩ, and stirred. Granular NaOH (made by Wako Pure Chemical Industries, Ltd., Reagent Special Class) was dissolved in ultrapure water to prepare aqueous NaOH solutions of 2 mol/L and 0.001 mol/L (pH 10). The 0.001 mol/L (pH 10) aqueous NaOH solution was placed in a 4 neck Teflon (registered trademark) round-bottomed flask. Two transparent cylindrical funnel separators, a reflux tube, and a pH meter were attached to the four mouths of the round-bottomed flask, and an aqueous solution in which $AlCl_3$ and $MgCl_2$ were dissolved and a 2 mol/L aqueous NaOH solution were put into the two funnel separators, respectively. $N_2$ gas was flowed into the whole equipment for about 30 minutes, and $CO_2$ gas was expelled. When an aqueous solution in which $AlCl_3 \cdot 6H_2O$ and $MgCl_2 \cdot 6H_2O$ were dissolved and a 2 mol/L aqueous solution of NaOH were alternately dropped into a 0.001 mol/L aqueous solution of NaOH while checking that the pH did not vary greatly from 10, a white precipitate of LDH was produced. At this time, the mixture was stirred at about 500 rpm to make the solution uniform. After completion of the dropping, the round-bottomed flask was heated in an oil bath at 70° C. for half a day while running tap water through the reflux tube. After heating, the turbid liquid of LDH was put into a centrifuge tube made of Teflon (registered trademark), and was centrifuged in a centrifuge at 20,000 G with a holding time of 5 minutes. The clear supernatant liquid was removed with a pipette, and the ultrapure water was put into a centrifuge tube and stirred again to make a white turbid liquid, and then was centrifuged again under the same conditions. Three cycles of centrifugation and removal of the supernatant removed the impurity NaCl. The obtained powder was heated to about 50° C. and subjected to a vacuum exhaust heat treatment for about half a day to be dried, thereby obtaining white powder LDH-1.

The product was analyzed by methods such as infrared spectroscopy and powder X-ray analysis. As a result, it was confirmed that a decarboxylation ion was replaced with a chloride ion. The composition of the starting layered double hydroxide (LDH-1) can be represented by a formula: $Mg_6Al(OH)_{16}(Cl^-)_2$.

Synthesis Example 2

"Preparation of Electronic Exchanger of the Invention"
<Preparation of Sodium and THF Solution>
  Sodium (Na): manufactured by Fujifilm Wako Pure Chemical Industries, Ltd., purity 98%, usage volume 0.115 g, block shape (about 1 cm×1 cm)
  Pretreatment process: Na blocks in oil were taken out in a glove box, and the surface was scraped off with a spatula.
  THF: manufactured by Fujifilm Wako Pure Chemical Industries, Ltd., purity 99.5% (deoxidized), addition amount 20 ml
<Mixing Sodium, THF Solution, and 15-Crown-5-Ether>
  15-Crown-5-Ether: manufactured by Fujifilm Wako Pure Chemical Industries, Ltd., purity Wako First class, addition amount 1.1 g
  The surface of the metal Na block (made by Fujifilm Wako Pure Chemical Industries Ltd., 98%) was scraped off with a spatula in a glove box in an Ar atmosphere to expose pure unoxidized Na mass. The Na and the crown ether were weighed in a molar ratio of 1:1 and were charged into a vial tube. 20 ml of THF (manufactured by Fujifilm Wako Pure Chemical Industries, Ltd., deoxygenation, stabilizer-free, 99.5%) was put into it. The crown ether was 15-crown-5-ether (manufactured by Fujifilm Wako Pure Chemical Industries, Ltd., Wako Class 1). A Teflon (registered trademark) agitator was placed in the vial, and stirring was started to obtain a deep blue liquid (Liquid Mixture M1) of the solvated electron solution in about 1 to 3 days.

Example 1

<Producing Step>
  The LDH-1 obtained in Synthesis Example 1 was evacuated at 200° C. for 6 hours to remove water contained in the material and was put into a glove box in an Ar atmosphere. 0.135 g of LDH was added to the liquid mixture M1 prepared by the above method. Thereafter, the mixture was stirred at room temperature for 238 hours.

After the completion of the ion exchange, the solution was charged into a centrifuge tube made of Teflon (registered trademark) and was centrifuged using a centrifuge at 20,000 G with a holding time of 5 minutes. The supernatant liquid was removed, THF was charged, and the centrifuge tube was stirred and centrifuged under the same conditions. This was repeated three times to remove the impurity crown ether. These operations were performed in a glove box in an Ar atmosphere. Finally, a powdery layered double hydroxide electrode was obtained by performing a vacuum evacuation treatment while heating at 50° C. for 12 to 24 hours.
<Cleaning Step and Drying Step>
  After the completion of the ion exchange, the solution was charged into a centrifuge tube made of Teflon (registered trademark) and was centrifuged using a centrifuge at 20,000 G with a holding time of 5 minutes. The supernatant liquid was removed, THF was charged, and the centrifuge tube was stirred and centrifuged under the same conditions. This was repeated three times to remove the impurity crown ether. These operations were performed in a glove box in an Ar atmosphere. Finally, a black powdery layered double hydroxide electrode (LDHE-1) was obtained by performing a vacuum evacuation treatment while heating at 50° C. for 12 to 24 hours.
<Evaluation>
  The LDHE-1 obtained in Example 1 was evaluated by the evaluation method described above. The electron density was $6.53 \times 10^{20}$ cm$^{-3}$. FIGS. 3-7 show results of the absorption spectrum, infrared spectrum, FT-IR absorption spectrum, XPS pattern, and ESR spectrum, respectively.

As a result of the above analysis, in the layered double hydroxide electrode (LDHE-1) obtained in Example 1, the chloride ions of the starting layered double hydroxide (LDH-1) were replaced with an electron. It was found the resulting product was a layered double hydroxide electrode represented by a formula: $Mg_6Al(OH)_{16}(Cl^-)_{2-y}(e^-)_y$. It was also inferred that less than 1/5 of the interlayer Cl$^-$ in the starting layered double hydroxide were replaced with electrons. That is, y was estimated to be less than about 0.4.

Example 2

A layered double hydroxide electrode (LDHE-2) was obtained in the same manner as in Example 1 except that it was left at room temperature for 167 hours in the producing step. Evaluation was performed by the same evaluation method as in Example 1. The results are shown in FIGS. 3-7.

As a result of the above analysis, it was found that the layered double hydroxide electrode (LDHE-2) obtained in Example 2 was a layered double hydroxide electrode represented by a formula: $Mg_6Al(OH)_{16}(Cl^-)_{2-y}(e^-)_y$, in which the chloride ions of the starting layered double hydroxide (LDH-1) were replaced by electrons. It was also inferred that less than 1/10 of the interlayer Cl$^-$ in the starting layered double hydroxide were replaced by electrons. That is, y was estimated to be less than about 0.2.

Example 3

A layered double hydroxide electrode (LDHE-3) was obtained in the same manner as in Example 1 except that it was left at room temperature for 200 hours in the producing step. Evaluation was performed by the same evaluation method as in Example 1. It was found that the layered double hydroxide electrode (LDHE-3) obtained in Example 3 is a layered double hydroxide electrode represented by a formula: $Mg_6Al(OH)_{16}(Cl^-)_{2-y}(e^-)_y$, wherein the chloride ions of the starting layered double hydroxide (LDH-1) were replaced with electrons.

It was also inferred that less than 1/8 of the interlayer Cl$^-$ in the starting layered double hydroxide were replaced by electrons. That is, y was estimated to be about 0.20.

The invention claimed is:

1. A layered double hydroxide electrode which comprises electrons between layers and which has an electron density of $2.0 \times 10^{18}$ cm$^{-3}$ or more.

2. The layered double hydroxide electrode according to claim 1, wherein the layered double hydroxide electrode is a layered double hydroxide electrode represented by a general formula (1), $$[M^{p+}{}_{1-x}N^{q+}{}_x(OH)_2]^{a+}[A^{r-}{}_{(b-y)}e^-{}_y] \cdot mH_2O \qquad (1)$$

wherein, in the general formula (1),

M is a metal element capable of forming at least a monovalent metal cation;

N is different from M, and is a metallic element capable of forming at least a monovalent metal cation;

A is an atom or group of atoms capable of forming at least a monovalent anion;

p is 1 or 2;
q is 3 or 4;
r is 1 to 3;
$0<x<0.9$;
$a=p\times(1-x)+x\times q-2$;
$b \geq a/r$;
$0<y\leq b$; and
$0\leq m\leq 10$.

3. A method of producing a layered double hydroxide electride, comprising a step of mixing a starting layered double hydroxide and an electron exchanger which exchanges an anion existing between layers of the starting layered double hydroxide for an electron.

4. The method of producing a layered double hydroxide electride according to claim 3, wherein the electron exchanger is a mixture of a crown ether compound and a THF-based organic solvent having an alkali metal.

5. The method of producing a layered double hydroxide electride according to claim 3, wherein the layered double hydroxide electride is a layered double hydroxide electride represented by a general formula (1); and the starting layered double hydroxide is a layered double hydroxide represented by a general formula (2), (1)

wherein, in the general formula (1),

M is a metal element capable of forming at least a monovalent metal cation;

N is different from M, and is a metallic element capable of forming at least a monovalent metal cation;

A is an atom or group of atoms capable of forming at least a monovalent anion;

p is 1 or 2;
q is 3 or 4;
r is 1 to 3;
$0<x<0.9$;
$a=p\times(1-x)+x\times q-2$;
$b \geq a/r$;
$0<y\leq b$; and
$0\leq m\leq 10$, (2)

wherein, in the general formula (2), M, N, A, p, q, r, x, a, b, y, m have the same meaning as M, N, A, p, q, r, x, a, b, y, m in the general formula (1).

6. The method of producing a layered double hydroxide electride according to claim 4, wherein the crown ether compound is at least one crown ether compound selected from the group consisting of 15-crown-5-ether, 12-crown-4-ether, and 18-crown-6-ether.

7. The method of producing a layered double hydroxide electride according to claim 4, wherein the alkali metal is sodium.

8. The method of producing a layered double hydroxide electride according to claim 4, wherein the crown ether compound is at least one crown ether compound selected from the group consisting of 15-crown-5-ether, 12-crown-4-ether, and 18-crown-6-ether; and the alkali metal is sodium.

9. The method of producing a layered double hydroxide electride according to claim 4, comprising:

a mixing step of mixing the crown ether with the THF-based solvent of the alkali metal to obtain a mixed liquid;

a producing step of adding the starting layered double hydroxide to the mixed liquid to produce a layered double hydroxide electride;

a cleaning step of cleaning the layered double hydroxide electride obtained in the producing step; and a drying step of drying the layered double hydroxide electride obtained in the cleaning step.

* * * * *